Sept. 27, 1960

G. E. BASS ET AL 2,954,010

EXHAUST VALVE FOR FLUID MOTORS

Original Filed Oct. 25, 1956

INVENTORS
GEORGE E. BASS
FRANK MARTINDELL
CHARLES K. EMERSON

ATTORNEY

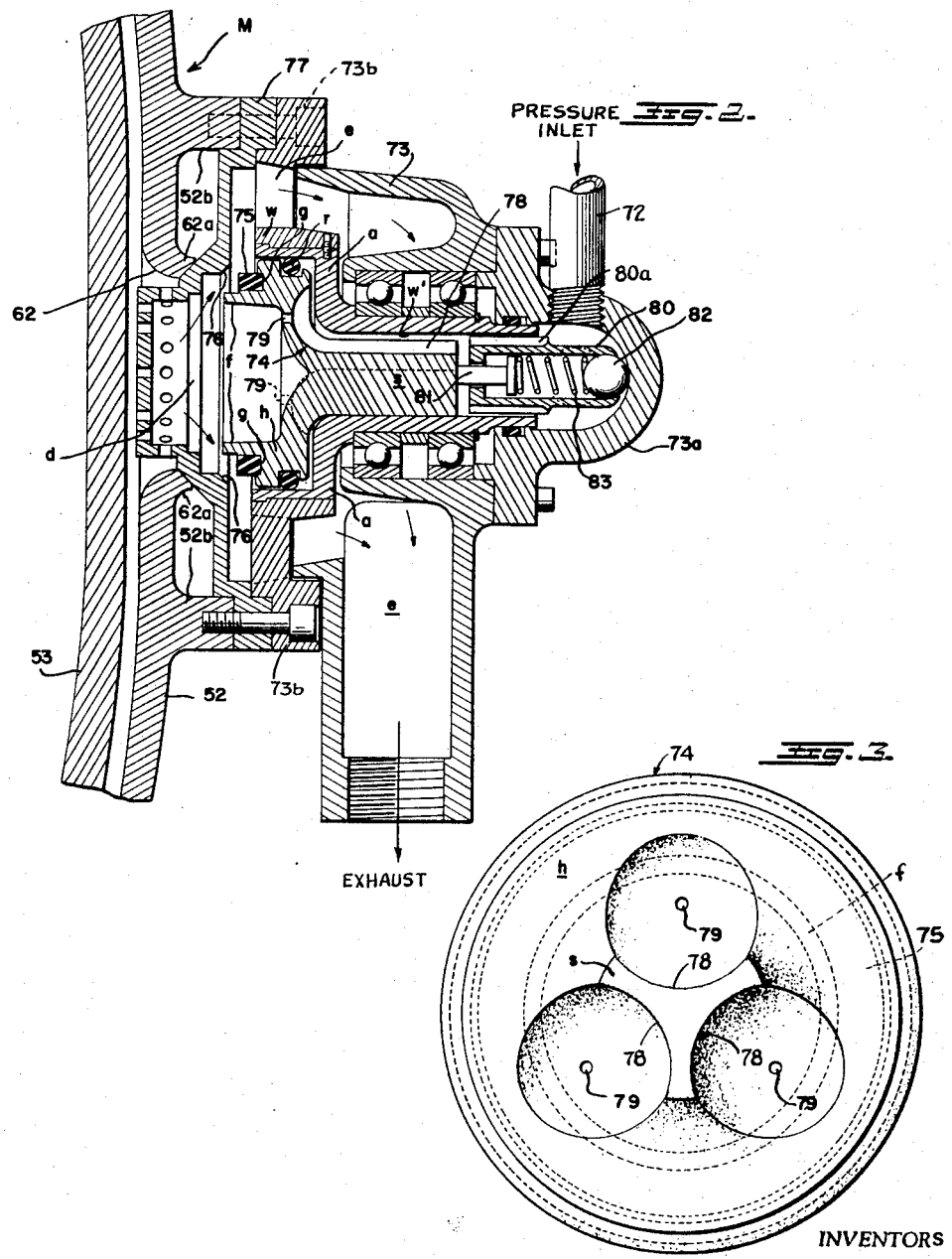

United States Patent Office 2,954,010
Patented Sept. 27, 1960

2,954,010

EXHAUST VALVE FOR FLUID MOTORS

George E. Bass, Frank Martindell, and Charles K. Emerson, Cumberland County, N.J., assignors to Ferracute Machine Company, Bridgeton, N.J., a corporation of New Jersey Original application Oct. 25, 1956, Ser. No. 618,341, now Patent No. 2,889,021, dated June 2, 1959. Divided and this application Nov. 4, 1957, Ser. No. 694,359

7 Claims. (Cl. 121—46.5)

The present invention relates to improvements in a, so-called, poppet-valve used in combined clutch-brake mechanisms of the type generally employed in mechanical presses and similar machines designed for heavy-duty metal working.

In clutch-brake mechanisms actuated by compressed air through means of a cylinder and piston, a freely slidable exhaust valve member has been disposed in the compressed air line at the intake to the cylinder and is actuated to close an exhaust port by the air admitted to the cylinder and actuated to open said port by the air pressure wtihin the cylinder when the compressed air supply is released by another control valve.

Heretofore, this exhaust valve member has been equipped with a seat-ring of relatively soft material to provide a sealing contact with the valve seat. It has been considered necessary, heretofore, to fix this seat-ring permanently in place against movement on the valve because it is of such character, construction and material as will not permit it to be stretched into place in a groove or the like. Since this seat-ring is subject to wear and damage and, hence, needs to be replaced from time to time, it has been removably clamped to the valve member by various clamping means. However, the force of the movement of said valve member, under the air pressure acting thereon, plus its abrupt stoppage at the ends of its movements, is such that the various clamping means that have been employed have failed due to fatigue, such as crystallization, stress-corrosion or the like, and the broken or loosened parts have entered the cylinder and prevented or hindered proper operation of the actuating piston to stop the machine. Such failures have resulted in injury to the operating attendant as well as to the press.

According to the present invention, it has been discovered that such seat-ring need not be permanently fixed to or removably clamped to the valve member, but may be loosely carried by the exhaust valve member, thus permitting the moving valve element to be of one homogeneous metal piece with the sealing or seat-ring readily removable therefrom when necessary for quick and easy replacement and eliminating the hazards of broken or loosened parts of the valve which prevent the proper operation of the press; and it has been discovered also that the life of the seat-ring may be substantially increased and its proper seating assured by providing a biasing means that will return the exhaust valve member to its closed position with comparatively small pressure after each opening of the exhaust valve member and before the admission of the air pressure to the cylinder.

The object of the present invention is to provide a very simple and inexpensive valve member having a construction and design which overcomes the drawbacks above mentioned and which lends itself to the discoveries just mentioned.

With such objects in view, and other objects which will appear as the description proceeds, the invention comprises various novel features of construction and arrangement of parts as will be set forth with particularity in the following description and the claims appended thereto.

In the drawings:

Figure 2 is a sectional view of the valve-casing and taken substantially on line 2—2 of Figure 1 and illustrating in full lines the improved valve member in open or exhausting position; and Figure 3 is an enlarged view of the exhaust poppet valve-member shown in Figure 2, looking from the stem-end of the valve-member to the head thereof.

Figure 1:
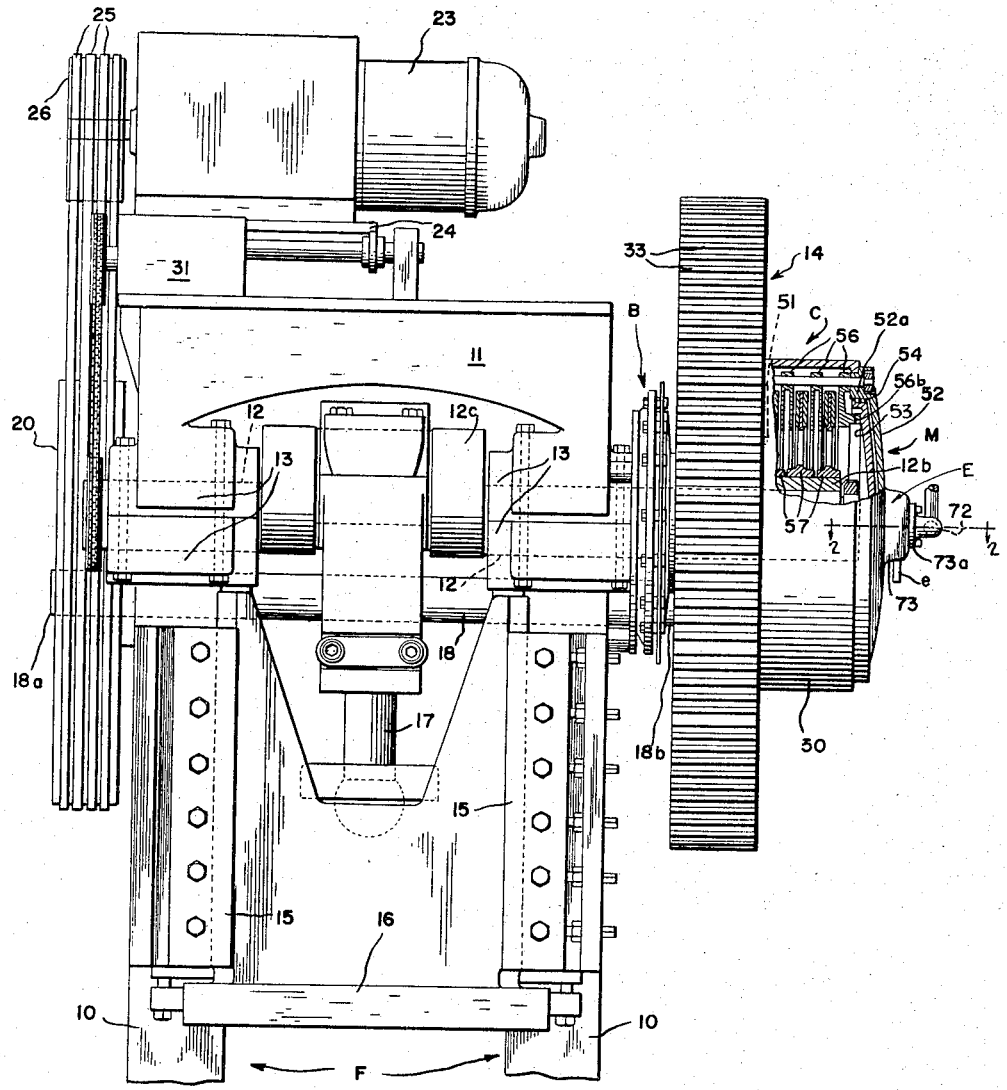
Figure 1 is a front elevational view of the upper portion of one form of press equipped with a clutch-brake mechanism and having the present invention applied thereto.

The improved exhaust valve assembly E of the present invention is shown in Figure 1, for purposes of illustration, as applied to a metal-working press for which it is designed particularly, although it may be used with other types of mechanisms where its construction and function are desirable. The press, shown in Figure 1, has a C-type frame F including spaced vertical supporting side members 10 terminating at their upper ends in a horizontal connecting head or crown 11, forming the forward or front overhanging portion in which a driven crank shaft 12 is journalled in suitable bearings 13 with the crank portion 12ᶜ positioned between said frame members 10 and with one end of the crank-shaft projecting for a distance beyond the frame to support a driving gear 14 and the brake B and the clutch C. Above the bed or entablature of the press, not shown, the frame members 10 are provided with guides 15 in which a ram or slide 16 is reciprocated vertically by a pitman 17 connecting the ram with the crank 12ᶜ. It is to be understood, however, that the press may have two or more cranks 12ᶜ and pitmans 17 to actuate the ram 16.

To the rear of the crank-shaft 12, a driving shaft 18 is journalled in bearings mounted in the frame members 10 with its ends extending beyond the said frame, one end 18ᵃ having a pulley-flywheel 20 keyed thereon and the end 18ᵇ having a pinion gear, not shown, keyed thereon and meshing with the driving gear 14. The pulley-flywheel 20 is operatively connected with any source of power, such, for instance, as an electric motor-gear reduction unit 23 mounted on a suitable platform 24 supported upon the crown 11, connected by a belting 25 passing over a pulley 26 carried on the motor unit 23.

The driving gear 14 is the driving element of clutch C and is rotatably journalled on an end extension of the crank-shaft; and the crank shaft 12 is the driven element of the clutch. A fluid-actuated motor M is carried at the outer end of said clutch assembly C for operating the clutch assembly to engaging position and the brake B is mechanically interconnected through the gear 14 with the clutch assembly (as shown and described in the parent application, now United States Letters Patent No. 2,889,021) so as to be actuated coordinately with the clutch in order that, when the clutch is engaged, the brake is completelyl released, and conversely.

The clutch C comprises a sleeve housing 50 concentric with the shaft 12 and carried by and projecting outwardly from the driving gear 14, it being preferred to cast this housing with said gear, as shown, although this is not necessary. The inner end or inboard portion of the sleeve housing 50 is formed with an interiorly disposed inwardly extending annular wall 51 providing the fixed driving plate of the clutch. The outer end of the sleeve housing 50 is closed by a removable wall member 52, which is somewhat concaved or dished on its inner surface and rimmed by an inwardly extending lateral flange 52ᵃ. The inner surface of the rim 52ᵃ forms a relatively short cylindrical wall in which a piston head 53 operates, thus providing the fluid-motor M of the mechanism.

Interposed between the fixed clutch-plate 51 and the piston-head 53 is a series of axially shiftable and annular clutch plates, the plates 56 of which being mounted to rotate with the clutch housing 50 and the alternate plates 57 being mounted to rotate with the shaft 12.

The outermost of the annular clutch plates 56 is provided at its inner circumference with an outwardly projecting flange or abutment 56$^b$ to normally contact the inner face of the piston 53, whereby, when compressed air is admitted through the port 62 in the end wall 52, the piston 53 will move to the left in Figures 1 and 2, firmly pressing the slidable clutch-plates 56 and the clutch discs 57 together against the fixed clutch plate 51, thus engaging the clutch assembly. When the air pressure is relieved, it escapes through the port 62 in the wall member 52, Fig. 2 (as will be presently explained), allowing the clutch to disengage and, when so disengaged, helical compression springs (not shown) separate the clutch plates to provide a running clearance, thus eliminating undue heating by friction.

The port 62 of the fluid motor M is equipped with what is known as a "quick exhaust valve" E which is closed and held closed by the admission of air pressure to the motor M and, when this pressure is relieved either automatically or manually (by mechanism well known in the art), the pressure within the motor M opens the exhaust valve spontaneously and vents the motor quickly to the atmosphere.

The exhaust valve E, which has been most efficacious for the purpose just mentioned and particularly with the mechanism herein shown and described, is of the type generally shown in Figure 2 but wherein the valve member 74 has been of the poppet type and free-floating in the casing 73 and the seat-ring 75 thereof has been fixed in position on the valve member 74 by a clamp assembly including a bolt and lock-nut, the bolt extending axially into the stem of the valve member and both bored axially to permit the admission thereto and passage therethrough of the compressed air from a controlled supply source (not shown) and admitted to the valve casing 73 through an intake port 72 in the removable valve cap 73$^a$. Since this compressed air, being admitted to the cylinder 52, also, at the same time, closes the freely slidable valve member from its open exhausting position to its seated or closed position, this movement occurs with great force and has caused valve members heretofore employed to strike their seats with a blow in the order of 500 pounds p.s.i. The continued and repeated operation of the poppet valve member 74, in its opening and closing movements under such force, has caused the clamping means to fail and parts, or broken parts, thereof to enter between the head 52 of the cylinder and the piston 53, thus preventing the clutch from disengaging properly and the brake from being applied—with disastrous results.

In the quest to overcome this difficulty, it has been found, contrary to previous belief, that the seat-ring 75 need not be clamped in position, thereby eliminating the necessity for clamping means for the sealing-ring which, from time to time, needs replacement. In consequence, the quick exhaust valve assembly E has been improved as shown in Figures 2 and 3 and found to give eminently satisfactory results in over a million operations on an actual press.

In this improvement, no change has been made in the valve casing 73, as shown, but the valve member 74 comprises a one-piece structure having a solid valve stem $s$ and a lateral outwardly flared circular head $h$ formed thereon and fashioned to withstand the severe hammer blows to which it is subjected, without breaking or cracking. The head is slidably guided within a cylindrical guide wall $w$ of the casing 73 which terminates in an inwardly extending abutment $a$ behind the head of the valve member 74 for limiting the opening movement of the valve member against the exhausting pressures, and the stem is guided by a tubular wall $w'$ which is a rearward extension of wall $w$. An O-ring-seal $r$ is provided on and circumferentially of the valve head $h$ to contact the guide walls $w$. The outer face of the valve head $h$ is formed with an outwardly and axially extending annular skirt or sleeve-like flange $f$ of less diameter than the head to extend into the depression $d$ of a strainer member 77 interposed between the base 73$^b$ of the valve casing 73 and the usual bosses 52$^b$ on the cylinder head 52 and seats on the seat 62$^a$ of the port 62. A sealing ring 75 surrounds said flange, with a sliding fit, to seat upon the valve-seat 76 formed on the strainer plate 77 around the rim edge of the foraminated depression $d$ therein. The seat 76 is positioned preferably to overlie or align with the seat 62$^a$ so that, if the strainer is not employed, the valve member 74 and its sealing-ring 75 will be dimensioned to cooperate with the usual seat 62$^a$ of port 62 in the same manner as it would with the valve seat 76. The skirt or sleeve flange $f$ on the valve head $h$ is of such length—substantially greater than the axial thickness of the sealing-ring 75—as to extend beyond, or at least within, the plane of the valve-seat 76 or 62$^a$, when the poppet valve member 74 is fully opened (as shown in Figure 2), and thereby maintain the sealing ring 75 thereon even in the fully opened position of said valve members.

To provide a firm seat for the sealing-ring 75 on the head $h$ and to prevent undue deformation or spreading thereof, the head $h$ may be provided with an annular groove $g$ at the juncture of the flange $f$ with said head, into which groove the rear end portion of the sealing-ring may seat.

In order that the compressed air supply from the port 72 may pass through the valve member 74 and, at the same time, exert pressure upon said valve to firmly press the sealing ring 75 against its seat 76 or 62$^a$, the valve stem $s$ is fluted axially of its length, as shown at 78 in Figures 2 and 3, and these flutes terminate at the head where there is provided for each of them a port 79 dimensioned so as to admit the proper amount and flow of compressed air to the piston 53.

It has been found that the life of the sealing-ring 75 may be prolonged over all previous experience by the provision of a biasing means 80 inserted between the removable cap 73$^a$ of the valve casing 73 and the free end of the valve stem $s$ for the purpose of re-seating the poppet valve member 74 after the compressed air has been exhausted into the exhaust passage $e$ of the valve casing 73 from the cylinder 52. This biasing means may have a compression force of about 5 pounds, more or less, for resetting the valve member 74 instead of relying upon the much greater incoming air pressure from the port 72 (at about 500 pounds p.s.i.) to move the valve member 74 to its seat and subject the valve member and its sealing-ring 75 to the resultant hammer blow when striking its seat 76 or 62$^a$. This biasing means may consist of a tubular capsule or casing, fluted on its exterior surface as at 80$^a$, and contains a plunger 81 at one end and a ball 82 at the other end, between which is interposed a helical compression spring 83. The plunger 81 is provided with an enlarged inner head within the capsule 80, so that it may be retained therein, and the ball is maintained in position by peening the ends of the tube about its diameter so that a portion of the ball protrudes therefrom. While other types of biasing means 80 may be employed, the device shown is self-contained, readily adaptable to be inserted as an assembled unit into the valve casing 73 of an existing press (by removing the cap 73$^a$) and is self-centering within the valve casing, thus keeping the valve member 74 centered relative to its seat 76.

The operation of the quick exhaust valve assembly E is as follows: When actuated by the usual timing mechanism 31, or when the attendant wishes, to engage the clutch C and release the brake B, the control mechanism (not shown) of the press is operated to admit compressed air to the port 72, from whence it enters the valve cap 73a and exerts a pressure under the head h of the valve member 74. The valve member 74, having already been moved by the biasing means 80 to bring the sealing ring 75 into contact with its seat 76, the air pressure from the port 72 acting on the valve head h firmly seals the valve member 74 on its seat 76 and closes all communication between the motor M and the exhaust passages e and, at the same time, the compressed air passes through the metering openings 79 in the valve head through the strainer 77 into the cylinder head 52 and exerts its pressure against the piston 53.

When the clutch C is to be disengaged and the brake B applied, the air control means is actuated to discontinue air pressure supply through the port 72 to the valve casing 73, thus relieving the intake side of the valve member 74 of air pressure; whereupon, the air pressure within the motor M immediately acts to move the poppet valve member 74 to the full-line position shown in Figure 2 and exhausts through the passages e to the atmosphere; whereupon, the biasing means 80 immediately returns the valve member 74 to closed position sufficiently to bring the sealing-ring 75 in contact with its seat 76 without undue hammer pressure, in which position it remains until air pressure again is admitted through the port 72 and the cycle just described is repeated.

The improvements of this invention may be applied to the clutch-brake mechanism of existing presses already in service, in the following manner:

The improved one-piece valve member 74 may be substituted for the existing poppet valve (briefly explained herein) and the strainer 77 inserted between the valve casing 73 and the cylinder head 52 and the biasing capsule 80 inserted at the end in the space between the valve casing cap 73a and the free end of the valve stem s without requiring modification of the remaining parts.

With the improved poppet valve, the strainer 77 may not be needed, as the poppet valve will cooperate with the existing seat 62a on the cylinder head 52 shown in Figure 2. However, the strainer plate may be included out of an abundance of precaution.

From the above, it will be observed that the improvements described and shown herein attain the objects of this invention above set forth.

This is a divisional application of application Serial No. 618,341, filed October 25, 1956, now matured in United States Letters Patent No. 2,889,021.

Having thus described the invention and the manner in which the same is to be performed, it is to be understood that the exact construction herein shown and described may be varied or modified within the spirit and scope of the appended claims; and that the invention is not to be limited to the exact construction shown herein, but only by the scope of the appended claims.

That which is claimed, as new and to be secured by Letters Patent, is:

1. A poppet exhaust valve assembly for quick acting fluid pressure motors which latter have a port therein rimmed by an outwardly directed valve seat; said valve assembly comprising a casing mountable about said port and having a passage therethrough terminating in an open end opposite and spaced from said valve seat of said port, said passage having an intake opening remote from its said open end connectable to a releasable fluid pressure supply; a one-piece poppet valve member having a head disposed in and slidably guided in the open end portion of said passage and having a sealing contact therewith and positioned to coact with said valve seat to close upon the same, when acted upon by pressure admitted at said intake opening, means for limiting the movement of said valve head from said valve seat, said valve head having a stem slidably mounted in said passage and further having a metering opening therethrough to allow fluid pressure from the intake opening to pass to said port, a reduced portion integral with and extending outwardly from and axially of the outer face of said head and of less diameter than the valve seat and projecting into said port when said casing is mounted in position on said motor, a sealing-ring surrounding and slidably fitted on said reduced portion and positioned to contact with said valve seat and of a thickness less than the length of said reduced portion, said reduced portion being of a length to extend at least to the plane of said valve seat, when the valve is fully open, to maintain said sealing-ring in operative position at all times without other retaining means and to permit its quick slidable replacement without stretching or distortion of said sealing-ring; and an exhaust port in said casing communicating with the space between said open end of said passage and said port in said motor, when the fluid pressure is relieved and the pressure within the motor forces said valve member from its seat.

2. The subject-matter of claim 1 further characterized by a strainer plate interposed between the valve casing and said motor with its portion opposite said port in the motor depressed and foraminated and extending into said port and formed with said valve seat rimming said depression in said strainer plate.

3. An exhaust poppet valve member to be actuated to closed position by intake pressure acting against one side thereof and opened by exhausting pressure acting against the opposite side thereof, said valve member comprising a head having its exhaust side to cooperate with a coacting seat, a reduced portion of uniform external diameter integral with and extending outwardly from and axially of said exhaust side of the head and of less diameter than the valve seat to project thereinto and to form an external shoulder with said head, a relatively yieldable sealing-ring fittedly surrounding and slidably mounted on said reduced portion to abut against said shoulder and positioned to contact with said valve seat and of a thickness less than the length of said reduced portion, said reduced portion being of a length to extend at least to the plane of said valve seat, when the valve is fully open from its seat, thus maintaining said sealing-ring in operative position at all times without other retaining means and permitting its quick removal and replacement on said valve member without stretching or distortion of said sealing-ring.

4. In a poppet valve member for a quick-acting exhaust valve assembly, a one-piece member including a stem having a lateral outwardly flared circular head from the outer face of which axially extends an annular flange of less diameter than said head and forming a shoulder with said head externally of said flange, and a sealing-ring surrounding said flange with a sliding fit and to contact a valve seat at a port and being of less thickness than the length of said flange, said stem having flutings longitudinally thereon to convey fluid pressure therealong, said flutings terminating at their inner ends in metering openings through the valve head and within the area defined by said annular flange for communicating opposite sides of said valve member to admit the passage of fluid pressure therethrough.

5. In an air pressure motor including a cylinder head having a port therein through which pressure is admitted to and exhausted from the cylinder and which port is rimmed by an outwardly directed valve seat; a valve casing surrounding said valve seat on said cylinder head and having a passage therethrough terminating in an open end opposite and spaced from said port and having its other end closed and, further, having an intake opening remote from its open end and connectable to a controlled and releasable pressure supply, said housing having an exhaust port surrounding said open end of said passage and spaced from said valve seat; a one-piece poppet valve having a head, guide means at the open end of said passage, in which said head is slidably mounted in sealing contact therewith, and positioned to direct said head to coact with said valve seat, said means having a part which limits the movement of said head inwardly of said passage; a fluted stem projecting from said head and slidably extending into said passage to be guided thereby and terminating between said intake opening and said head, said head having metering openings therethrough at the inner end of said flutes to allow passage of fluid pressure from the intake opening to said port in the cylinder head, whereby said admitted pressure acting on said poppet valve closes it on said seat; a tubular flange integral with the face of the head opposing the valve seat and extending outwardly from and axially of said head with a uniform external diameter and of less diameter than the valve seat and surrounding said metering openings; a sealing ring surrounding and slidably and fittedly mounted on said flange to abut against a shoulder on the head at its juncture with said tubular flange and positioned to contact with said valve seat and of a thickness less than the length of said tubular flange, said flange being of a length to extend at least to the plane of said valve seat, when the valve is fully open, whereby the ring may be maintained in operative position at all times without other retaining means and is quickly replaceable without stretching or distortion of the sealing-ring; and yieldable means normally biasing said valve member to its seated position.

6. The subject matter of claim 1 further characterized by a relatively weak biasing-means positioned and of only sufficient force to return said valve member to its seat after each opening movement of the valve member and prior to the admission of fluid pressure at said inlet opening in said passage.

7. The subject-matter of claim 6 wherein said passage is formed at its other end with an abutment surface, and wherein the biasing means is a capsule inserted in said passage between said abutment surface and said valve stem and containing a plunger mounted at one end of the capsule and projecting through said end in contact with the end of said valve stem and further containing a ball bearing mounted at the other end of said capsule and projecting therefrom in contact with said abutment surface of said passage, and compression spring means interposed between said plunger and said ball and normally exerting only sufficient force upon said valve member to re-seat the same, after the opening movement thereof.

References Cited in the file of this patent
UNITED STATES PATENTS

| | | |
|---|---|---|
| 2,124,407 | Stroup | July 17, 1938 |
| 2,488,949 | Walsh | Nov. 22, 1949 |
| 2,610,859 | Wilcox et al. | Sept. 16, 1952 |
| 2,716,997 | Crookston | Sept. 6, 1955 |